US005728001A

United States Patent [19]

Attridge, Jr.

[11] Patent Number: 5,728,001

[45] **Date of Patent: *Mar. 17, 1998**

[54] REMOTELY TRIPPABLE AND RESETTABLE DAMPER

[75] Inventor: Russell G. Attridge, Jr., Sunapee, N.H.

[73] Assignee: Johnson Controls, Inc., Milwaukee, Wis.

[ * ] Notice: The term of this patent shall not extend beyond the expiration date of Pat. No. 5,533,929.

[21] Appl. No.: 677,126

[22] Filed: Jul. 9, 1996

Related U.S. Application Data

[63] Continuation-in-part of Ser. No. 174,976, Dec. 29, 1993, Pat. No. 5,533,929.

[51] Int. Cl.[6] .................... F16K 17/40

[52] U.S. Cl. .................... 454/369; 137/79; 251/68

[58] Field of Search .................... 49/2; 137/78.1, 137/78.5, 79; 251/68, 303; 454/257, 357, 369

[56] References Cited

U.S. PATENT DOCUMENTS

| | | | |
|---|---|---|---|
| Re. 32,362 | 2/1987 | McCabe . | |
| 1,100,003 | 6/1914 | Watson | 454/369 X |
| 1,924,250 | 8/1933 | McGuire . | |
| 2,957,403 | 10/1960 | Krautz . | |
| 3,260,018 | 7/1966 | Schuh . | |
| 3,283,691 | 11/1966 | Reiter . | |
| 3,580,321 | 5/1971 | Root . | |
| 3,633,600 | 1/1972 | Root . | |
| 3,725,972 | 4/1973 | McCabe . | |
| 3,796,248 | 3/1974 | McCabe . | |
| 3,796,249 | 3/1974 | McCabe . | |
| 3,866,656 | 2/1975 | McCabe . | |
| 3,907,020 | 9/1975 | Root . | |
| 3,941,179 | 3/1976 | Root . | |
| 4,040,304 | 8/1977 | McCabe . | |
| 4,041,570 | 8/1977 | McCabe . | |
| 4,074,388 | 2/1978 | McCabe . | |
| 4,080,978 | 3/1978 | McCabe . | |
| 4,081,173 | 3/1978 | McCabe . | |
| 4,084,744 | 4/1978 | Wilson, Jr. | 454/369 X |
| 4,099,292 | 7/1978 | McCabe . | |
| 4,114,646 | 9/1978 | McCabe . | |
| 4,146,048 | 3/1979 | McCabe . | |
| 4,184,288 | 1/1980 | Magill et al. | 454/369 X |
| 4,213,227 | 7/1980 | McCabe . | |
| 4,219,041 | 8/1980 | McCabe et al. . | |
| 4,219,185 | 8/1980 | McCabe . | |
| 4,241,748 | 12/1980 | McCabe . | |
| 4,263,930 | 4/1981 | McCabe . | |
| 4,283,114 | 8/1981 | Wandrack . | |
| 4,295,486 | 10/1981 | McCabe . | |

(List continued on next page.)

FOREIGN PATENT DOCUMENTS

| | | |
|---|---|---|
| 2414256 | 10/1975 | Germany . |
| 1165635 | 10/1964 | United Kingdom . |
| 1419013 | 12/1975 | United Kingdom . |
| 2054132 | 2/1981 | United Kingdom . |
| 2084013 | 4/1982 | United Kingdom . |
| 2130882 | 6/1984 | United Kingdom . |

*Primary Examiner*—Harold Joyce
*Attorney, Agent, or Firm*—Hoffman & Baron, LLP

[57] ABSTRACT

A fail-safe closed damper for installation in a system of ducts. The damper includes at least one damper blade connected to a spring-loaded shaft. A power-actuated unit is employed to disengage a coupling which interconnects the spring-loaded shaft to an operating linkage. The use of the power-actuated unit ensures that the damper will be tripped at the appropriate predetermined temperature and will not be affected by the large frictional forces imparted on the components of the damper by the biasing spring or by such external factors as dust, humidity and dirt. The damper employs a sensor having dual sensing devices and which is centrally disposed in the duct to ensure receipt of a representative sample of airflow. The damper further includes a damper blade position indicator for sensing whether the damper blade is open or closed.

20 Claims, 14 Drawing Sheets

U.S. PATENT DOCUMENTS

| | | | |
|---|---|---|---|
| 4,301,569 | 11/1981 | McCabe . | |
| 4,338,967 | 7/1982 | McCabe . | |
| 4,359,934 | 11/1982 | Musacchia . | |
| 4,366,830 | 1/1983 | Becelaere . | |
| 4,390,123 | 6/1983 | McCabe . | |
| 4,442,862 | 4/1984 | McCabe . | |
| 4,472,999 | 9/1984 | McCabe . | |
| 4,474,167 | 10/1984 | McCabe . | |
| 4,517,765 | 5/1985 | Mucha . | |
| 4,531,534 | 7/1985 | Magill et al. . | |
| 4,545,363 | 10/1985 | Barchechat et al. . | |
| 4,555,981 | 12/1985 | McCabe . | |
| 4,559,867 | 12/1985 | Van Becelaere et al. . | |
| 4,581,987 | 4/1986 | Ulicny . | |
| 4,723,481 | 2/1988 | Hart et al. | 454/369 |
| 4,763,711 | 8/1988 | Hart et al. . | |
| 4,805,261 | 2/1989 | Barchechat . | |
| 4,817,912 | 4/1989 | McCabe . | |
| 4,905,344 | 3/1990 | McCabe . | |
| 4,911,065 | 3/1990 | Van Becelaere . | |
| 4,919,329 | 4/1990 | McCabe . | |
| 4,928,583 | 5/1990 | Taylor et al. . | |

REMOTELY TRIPPABLE AND RESETTABLE DAMPER

The present application is a continuation-in-part of application Ser. No. 08/174,976 filed Dec. 29, 1993 U.S. Pat. No. 5,533,929.

BACKGROUND OF THE INVENTION

The present invention relates to a damper and, more particularly, to a remotely trippable and resettable damper having improved sensing and actuation capabilities.

One damper commonly employed in the art is known as a combination fire and smoke damper. These dampers are typically installed at various locations in a building's ventilation system to prevent circulation of fire and smoke throughout the building during a fire condition. These prior art dampers generally include a damper blade(s) that can be maintained in either an open or a retracted position during normal operating conditions. Each of these dampers must also be capable of sensing a fire condition in the building and, thereafter, releasing or actuating the damper blade(s) to allow such blade(s) to travel to the closed position to provide a wall-like barrier in the ventilation system.

Early dampers, which typically were concerned only with limiting travel of fire through a ventilation system, included an accordion-type blade maintained in a folded state at the top of the damper. For example, U.S. Pat. No. 3,580,321 includes a blade that is maintained in a closure sealed by a hinged door. In a fire condition, the door is opened and the blade falls downward out of the closure due to gravity, thereby limiting travel of fire through the ventilation system.

However, there were several disadvantages with these early dampers. For example, many of them required that the damper blade be manually reset. This made it difficult for emergency personal to ventilate the building after the fire-fighting period. In particular, it is often desirable to be able to control the flow of smoke resulting from a fire in a building. The early fire dampers restricted the fire fighter's ability to accomplish this task because these early dampers, once closed, remained closed until after the fire was extinguished and the damper manually reset.

These early fire dampers also lacked the ability to effectively seal the ventilation duct during a fire condition. Because they operated on a gravity basis, they could not be designed in too tight a manner. In addition, early fire dampers lacked a fail-safe closed mode (i.e., a mode in which the damper blade automatically travels to the closed position in the event of a system malfunction).

Although resettable folding blade dampers are now known in the art, more recent dampers are designed with a rotatable damper blade(s), rather than a plurality of foldable blades. These newer dampers offer several advantages over the folding blade design. Particularly, a tighter seal can be accomplished and maintained with a rotatable-type damper. These same dampers are also more readily adaptable for inclusion of a fail-safe mode.

Rotatable-type dampers are typically designed with a single or a plurality of blades rotatably mounted on or connected to a shaft passing transversely across the damper. When the blades are maintained in an open position (i.e., the blades are aligned parallel to one another), air is free to travel through the ventilation system. However, when the blades are rotated to a closed position, the damper effectively seals off the ventilation system.

One such rotatable-blade damper is disclosed in U.S. Pat. No. 4,301,569. The '569 damper includes a plurality of rotatably-mounted damper blades interconnected by means of a common linkage. The linkage is pivotably connected to a rotatable plate-like member upon which a bi-metallic fire link is mounted. This link couples the plate-like member to a control shaft which is employed to maintain the damper blades in an open position during normal operating conditions. During a fire condition, the bi-metallic strip in the fire link expands outwardly, thereby decoupling the plate-like member from the control shaft. A biasing spring, which is associated with the plate-like member, then drives the member, along with the connected linkage and damper blades, to the closed position.

The structure and operation of the '569 damper produces several disadvantages. For example, the fire link employed in the '569 damper functions as both the fire-sensing means and the release means. Specifically, as the bi-metallic strip is heated, it expands outwardly, thereby recoupling the plate-like member from the control shaft. However, to decouple these components, the bi-metallic strip must overcome the strong friction force imparted on the components by the biasing spring. Because the bi-metallic strip has only a limited expansion force, it may be difficult for such strip to overcome the friction force and release the plate-like member from the control shaft. In addition, if the fire link remains unused for a period of time, factors such as rust, dirt and dust increase the likelihood that the bi-metallic strip will be unable to release the plate-like member from the control shaft. At the minimum, the temperature characteristics of the link will be affected and the damper will not be tripped at the appropriate predetermined temperature.

The '569 damper has a second significant disadvantage. Because the damper employs a bi-metallic strip to both sense a fire condition and release the damper blades, the positioning of the fire sensor is, by necessity, limited to a location on or adjacent the actuating mechanism of the damper. It may prove beneficial, however, to locate the fire sensor at a distance from the damper, or even to employ a plurality of sensors that would improve the sensitivity and reliability of the system.

A third disadvantage associated with the design of the '569 damper concerns the necessity of the actuating mechanism (i.e., the fire-link, plate-like member, etc.) to be located inside the ventilation system. As mentioned, the bimetallic strip, which must be positioned in the ventilation system in order to sense a fire condition, is an integral part of the actuating mechanism. Hence, it is not possible to locate such mechanism outside the ventilation system, (e.g., to avoid exposure to high temperatures) as may be desired in particular installations.

Although the above discussion pertains to combination fire and smoke dampers, dampers are employed in other applications such as the isolation of hazardous gases accidentally released in a laboratory facility. Dampers may also be employed to isolate certain regions of a building in preparation for the release of an inert gas such as halon. The dampers employed in these applications suffer from the same drawbacks associated with fire and smoke dampers. In short, a damper design such as the one employed by the '569 device, which relies on a heat-sensitive bimetallic release mechanism, is unable to be utilized in these other applications.

SUMMARY OF THE INVENTION

The present invention, which addresses the needs of the prior art, provides a damper for installation in a system of ducts. The damper includes a damper blade assembly having at least one damper blade operable between an open position and a closed position. The assembly further includes a rotatably supported shaft which is connected to the blade whereby rotation of the shaft moves the blade between the open and closed positions. This shaft is biased to drive the blade to the closed position. The damper also includes remotely operable control means releasably connected to the damper blade assembly for moving the damper blade between the open and closed positions and for holding the damper blade in the open position during normal operating conditions. The damper further includes a power-actuated unit for disengaging the damper blade assembly from the control means. Finally, the damper includes a remotely locatable sensor for sensing an environmental condition in the system. The sensor is centrally disposed in a duct of the system to ensure exposure to a representative sample of airflow. The sensor is operatively connected to the power-actuated unit to provide the unit with a signal in response to the environmental condition whereby the damper blade assembly is disengaged from the control means allowing the damper blade to be driven to the closed position.

In one preferred embodiment, the sensor includes first and second sensing devices for sensing temperature levels $T_1$ and $T_2$ in the duct system. The damper of the present invention also preferably includes a damper blade position indicator for sensing whether the damper blade is open or closed.

In another preferred embodiment, the damper includes a damper blade assembly having a plurality of interconnected damper blades operable between open and closed positions. The damper blade assembly further includes a rotatably supported shaft connected to at least one of the blades whereby rotation of the shaft moves the blades between the open and closed positions. The shaft is biased to drive the blades to the closed position. The damper further includes remotely operable control means releasably connected to the damper blade assembly for moving the damper blades between the open and closed positions and holding the damper blades in the open position during normal operating conditions. The damper further includes a power actuating unit for disengaging the damper blade assembly from the control means. Finally, the damper includes a remotely locatable sensor for sensing an environmental condition in the system. The sensor is operatively connected to the power actuated unit to provide the power actuated unit with a signal in response to the condition whereby the damper blade assembly is disengaged from the control means allowing the damper blade to be driven to the closed position.

As a result of the present invention, a damper is provided which ensures that a sufficiently large decoupling force will be applied to the coupling interconnecting the operating linkage and the rotatable shaft to which the damper blade is connected. This same damper is both remotely trippable and remotely resettable. Finally, the present invention provides a damper having a fail-safe closed mode.

DETAILED DESCRIPTION OF THE INVENTION

Figure 1:
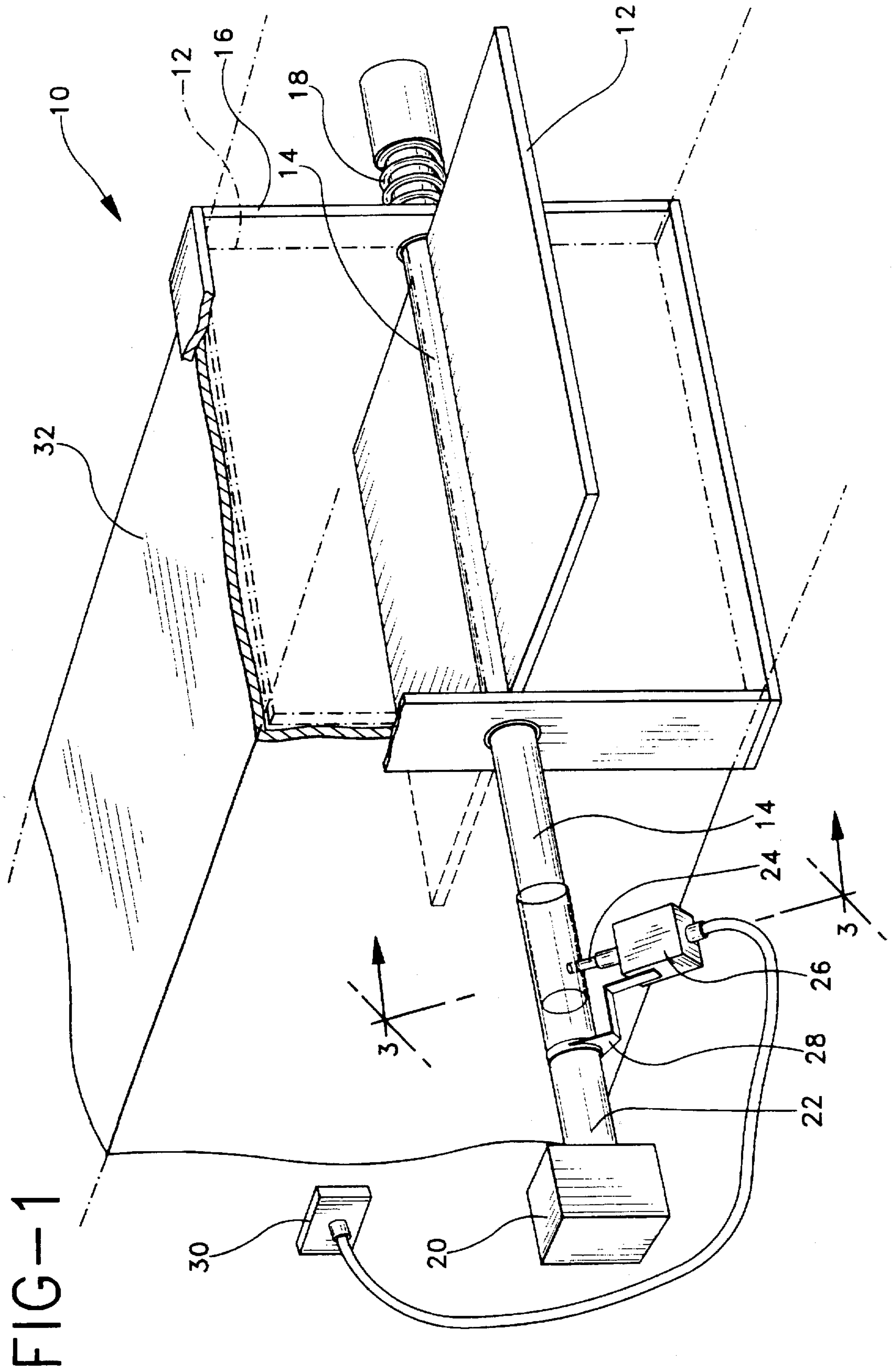
FIG. 1 is a perspective view of the damper of the present invention.

Referring to the drawings, a damper 10 for installation in a system of ducts (e.g., a ventilation system in a building) is shown in FIG. 1. Damper 10 includes a damper blade 12, which is connected to a shaft 14. Shaft 14 is rotatably supported by, for example, a damper frame 16. Although the damper illustrated in FIG. 1 includes only one damper blade, the same damper could include a plurality of damper blades.

As mentioned, shaft 14 is rotatably supported by the damper frame. For example, the frame, which is typically of a rectangular cross-section, may include a pair of opposing support beatings (not shown) to rotatably support the shaft, thereby allowing the damper blade connected to the shaft to travel between an open position (shown in solid in FIG. 1) and a closed position (shown in phantom in FIG. 1). In the closed position, the damper blade provides an effective barrier to gases (e.g., smoke) traveling through the system in, for example, a commercial building.

Damper 10 includes a spring 18 connected on one end of shaft 14 for biasing shaft 14 (and the attached damper blade) to the closed position. The other end of spring 18 may be secured, for example, to the frame of the damper. The inclusion of spring 18 in the damper provides such damper with a fail-safe closed mode. In other words, the blade(s) will be driven to the closed position unless the blade(s) is powered open, as described below.

As discussed further hereinbelow, the spring-loaded shaft may be laterally offset from the damper to allow installation of the damper in a fire wall. The spring-loaded shaft may be rotatably supported by, for example, mounting brackets which laterally project from the damper frame. In such an arrangement, a linkage arm extends between the rotatable spring-loaded shaft and the blade(s) whereby rotation of the spring-loaded shaft causes the blade(s) to travel between the open and closed positions.

The damper also includes remotely operable control means 20, which is releasably connected to shaft 14 through an operating linkage such as sleeve 22 and a coupling such as rod 24. Together, these components provide the actuating mechanism of the damper.

Rod 24, in turn is operatively connected to a power-actuated unit 26 that is capable of moving the rod between an engaged position with the sleeve and shaft in which the control means is in mechanical communication with the damper blade and a disengaged position with the sleeve and shaft in which the control means is mechanically isolated from the damper blade.

Specifically, when rod 24 is in the engaged position, control means 20, which is in mechanical communication with the damper blade, may be employed to move the damper blade between the open position and the closed position. The control means may also be employed to hold the damper blade in the open position during normal operating conditions.

Preferably, control means 20 constitutes one of the following: a hydraulic motor, a pneumatic motor or an electric motor. Control means 20 engages sleeve 22 and is capable of rotating such sleeve between a first position and a second position. Control means 20 is typically connected to a master control station in the building so that the control means can be remotely operated. Similarly, power-actuated unit 26 preferably constitutes one of the following: a hydraulic motor, a pneumatic motor or a solenoid.

Preferably, sleeve 22 and shaft 14 are telescopically arranged to allow such components to be readily coupled to one another. In the embodiment shown in FIG. 1, shaft 14 extends within sleeve 22. Power-actuated unit 26 is mounted on an arm 28 fixed to sleeve 22. Accordingly, as sleeve 22 is rotated by control means 20 between its first position and its second position, power-actuated unit 26, which is fixedly attached thereto, also rotates between a first position and a second position. Of course, other means of rotatably locking sleeve 22 to shaft 14 are also contemplated. For example, sleeve 22 may telescope within shaft 14. In such an embodiment, power actuated unit 26 may be mounted on an arm fixed to shaft 14, rather than sleeve 22. It is further contemplated that other sleeve/shaft arrangements may be employed in the present invention.

Damper 10 also includes a sensor 30 for sensing a particular environmental condition (e.g., a temperature rise in the duct indicating a fire condition) in the system. The sensor is operatively connected to power-actuated unit 26 to provide the unit with a signal (e.g., the application or removal of power) in response to the environmental condition whereby rod 24 is disengaged from the sleeve and shaft allowing the damper blade to be driven to the closed position. The present invention allows a plurality of sensors to be employed with the damper.

Figure 2:
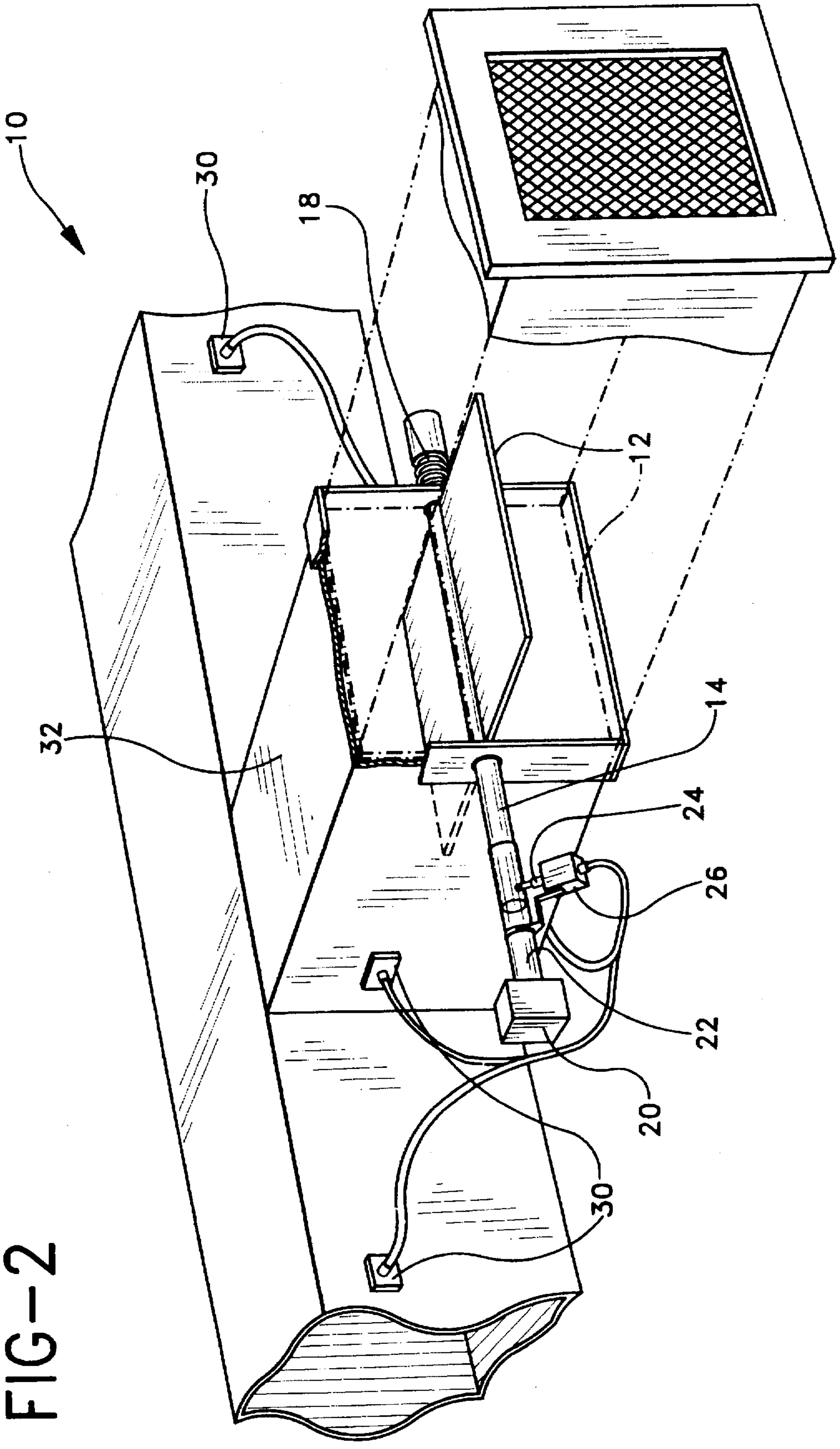
FIG. 2 is a perspective view of a damper employing a plurality of sensors and which is installed at a juncture in a duct system.

Sensors can be positioned at several key positions in the system and interconnected in such a fashion that if any one of the sensors is tripped, the damper will be actuated (i.e., the blade will be driven to the closed position). For example, as shown in FIG. 2, a damper may be installed at a juncture in a ventilation system. In such an arrangement, it may prove beneficial to position sensors at each of the three locations depicted in FIG. 2. With respect to a combination fire and smoke damper, this would ensure that fire and smoke traveling through the ventilation system was sensed at the earliest possible time. Particularly, if a smoke sensor is employed, the damper will be tripped much earlier than those prior art devices which rely only on a heat-sensitive bi-metallic strip. In other words, the sensor in these prior art devices must be exposed to a sufficiently high temperature to be tripped. Stated differently, the fire must approach the bi-metallic strip to heat the strip to its actuation temperature.

In contrast, the damper of the present invention, if employed as a combination fire/smoke damper, may be outfitted with a smoke sensor, among others. This smoke sensor would allow the damper to react to a fire condition in a remote region of the building. Particularly, the smoke sensor would sense the smoke resulting from the fire condition and trip the damper. As a result, the damper or dampers would be tripped at a much earlier point in time than had such damper relied only on heat-sensitive sensors.

Of course, the locations at which the sensors of the present invention may be positioned are not limited to those shown in FIG. 2. As noted, the design of the present invention allows many types of sensors to be utilized. For example, the damper of the present invention may utilize a bi-metallic strip to sense a fire condition, a smoke sensor capable of sensing smoke traveling through the system, a sensor capable of sensing the presence of a hazardous gas or a combination thereof. In short, the present invention, because of its design, allows the damper to be employed in several varied applications.

Figure 2A:
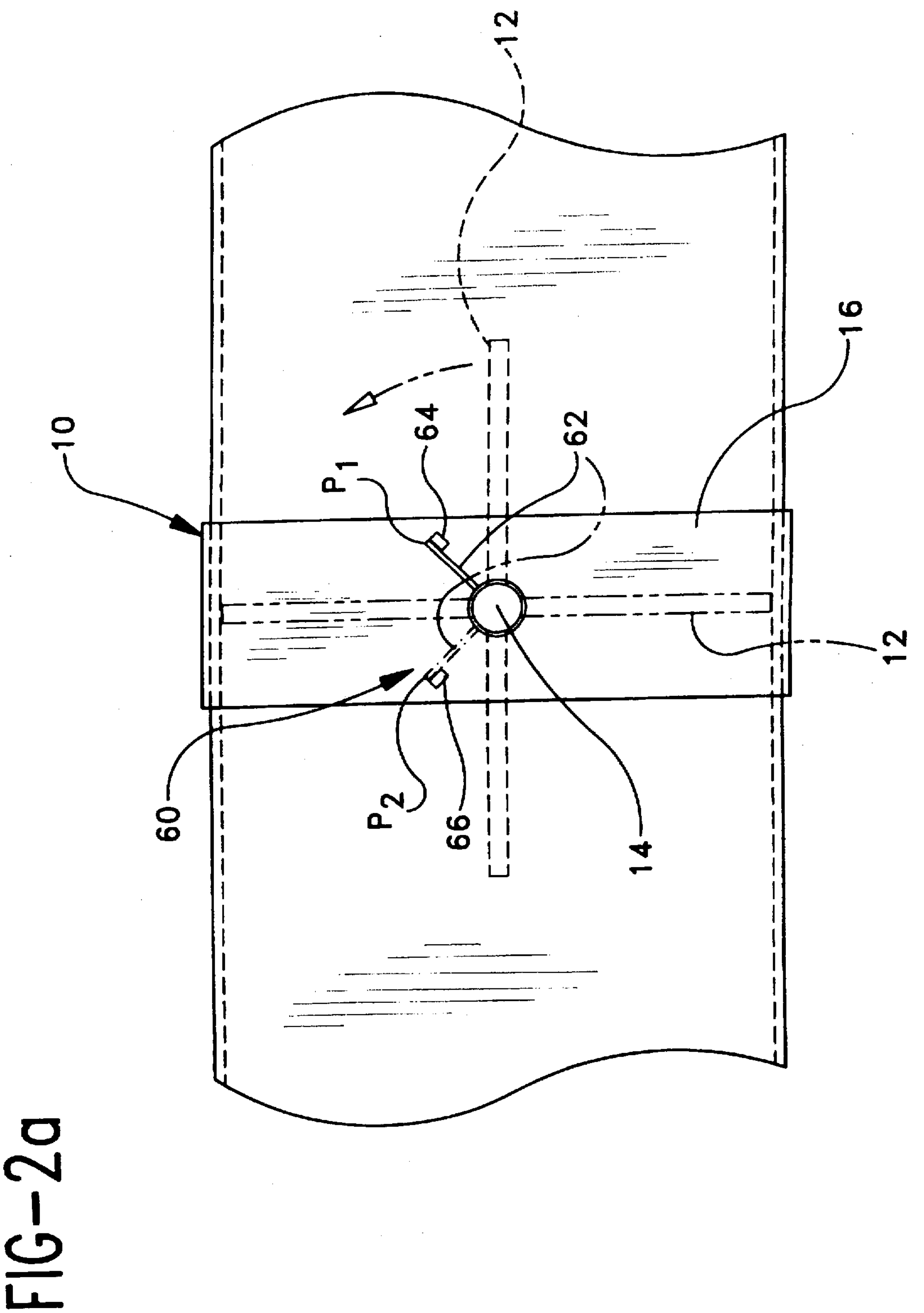
FIG. 2*a* is a side elevational view of the damper of FIG. 1 employing a damper blade position indicator.

Referring to FIG. 2*a*, damper 10 preferably includes a damper blade position indicator 60 for sensing whether damper blade 12 is open or closed. Unlike conventional ventilation systems which typically locate the damper blade position indicator within the duct thereby making it difficult to access as needed, position indicator 60 is located entirely outside of the duct. Position indicator 60 includes a signal arm 62 fixed to shaft 14. Inasmuch as signal arm 62 is connected to shaft 14 and shaft 14 is fixedly connected to damper blade 12, the signal arm will rotate in step with the damper blade thus indicating the position of the blade from outside the duct. The arm itself serves as a visual indication of the position of the damper blade if a fire fighter needs to verify the position of the blade. Moreover, position indicator 60 includes position sensors 64 and 66, which are located for contact by signal arm 62 as the signal arm rotates between a first position $P_1$ (wherein the blade is open) and a second position $P_2$ (wherein the blade is closed). Upon mechanical contact by the signal arm, the position sensor produces a signal indicative of the position of the damper blade. This signal is then sent to the remote command station. Any commercially available position sensor, e.g., mechanically actuated limit switches, magnetically sensitive proximity sensors, etc., may be employed.

Figure 2B:
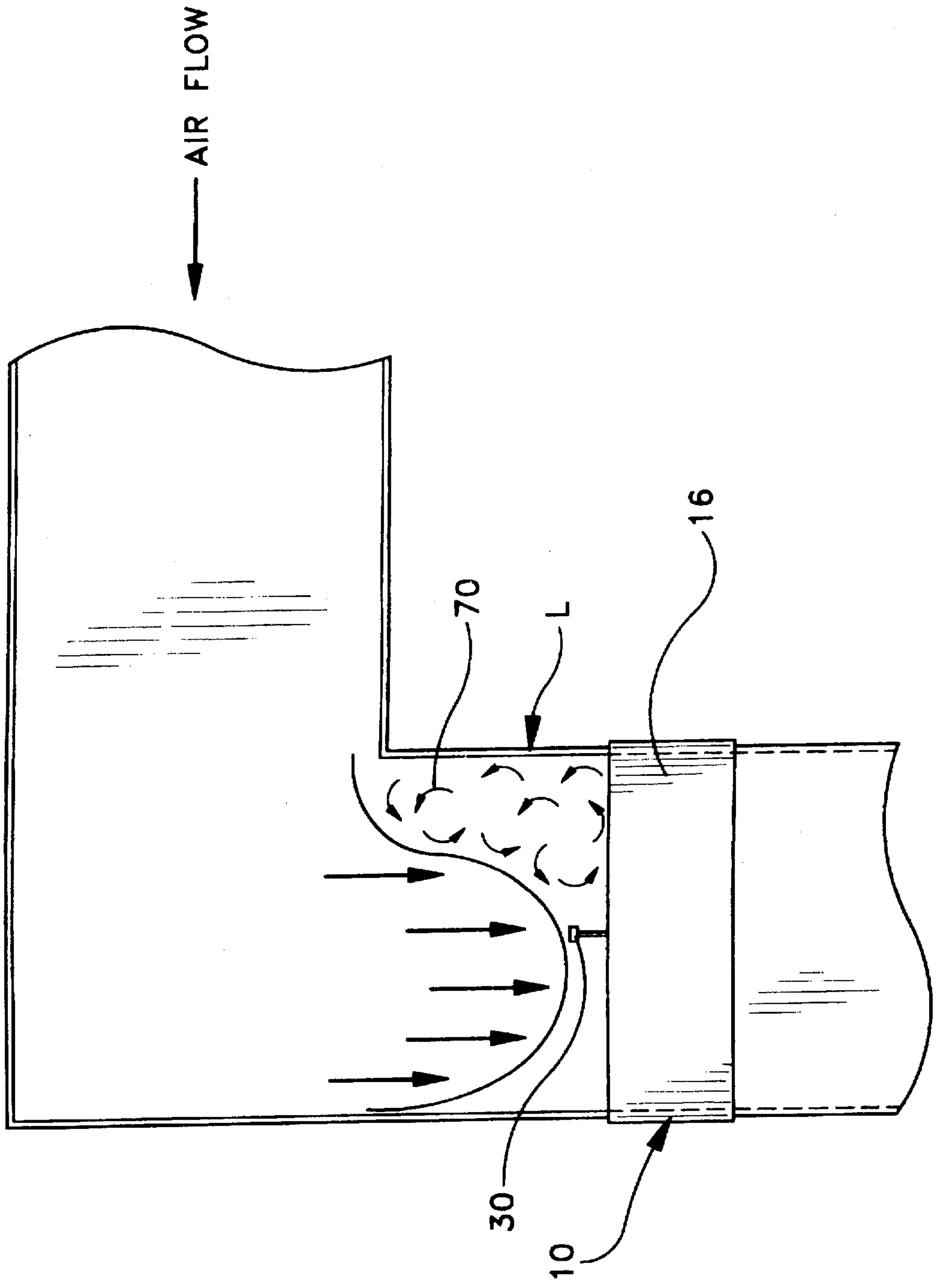
FIG. 2*b* is a top plan view depicting the airflow around an elbow in a duct network.

It will be recognized by those skilled in the art that an elbow (or obstruction) in the duct system (as shown in FIG. 2*b*) will often cause wake zones 70 and regions of turbulence along the sidewalls of the duct immediately following the bend (or obstruction). A sensor located in one of these wake zones (i.e., positioned on the sidewall at, for example, location L) will not receive a true sample of airflow and thus will provide less than optimum temperature readings and/or delayed warning time.

Accordingly, in one alternative embodiment, the sensors may be centrally disposed in the duct for increased sensitivity. By locating the sensors away from the side walls of the duct, the sensors are ensured of receiving a representative sample of airflow particularly when located downstream of an elbow (or obstruction) in the duct network which may distort the airflow.

Figure 2C:
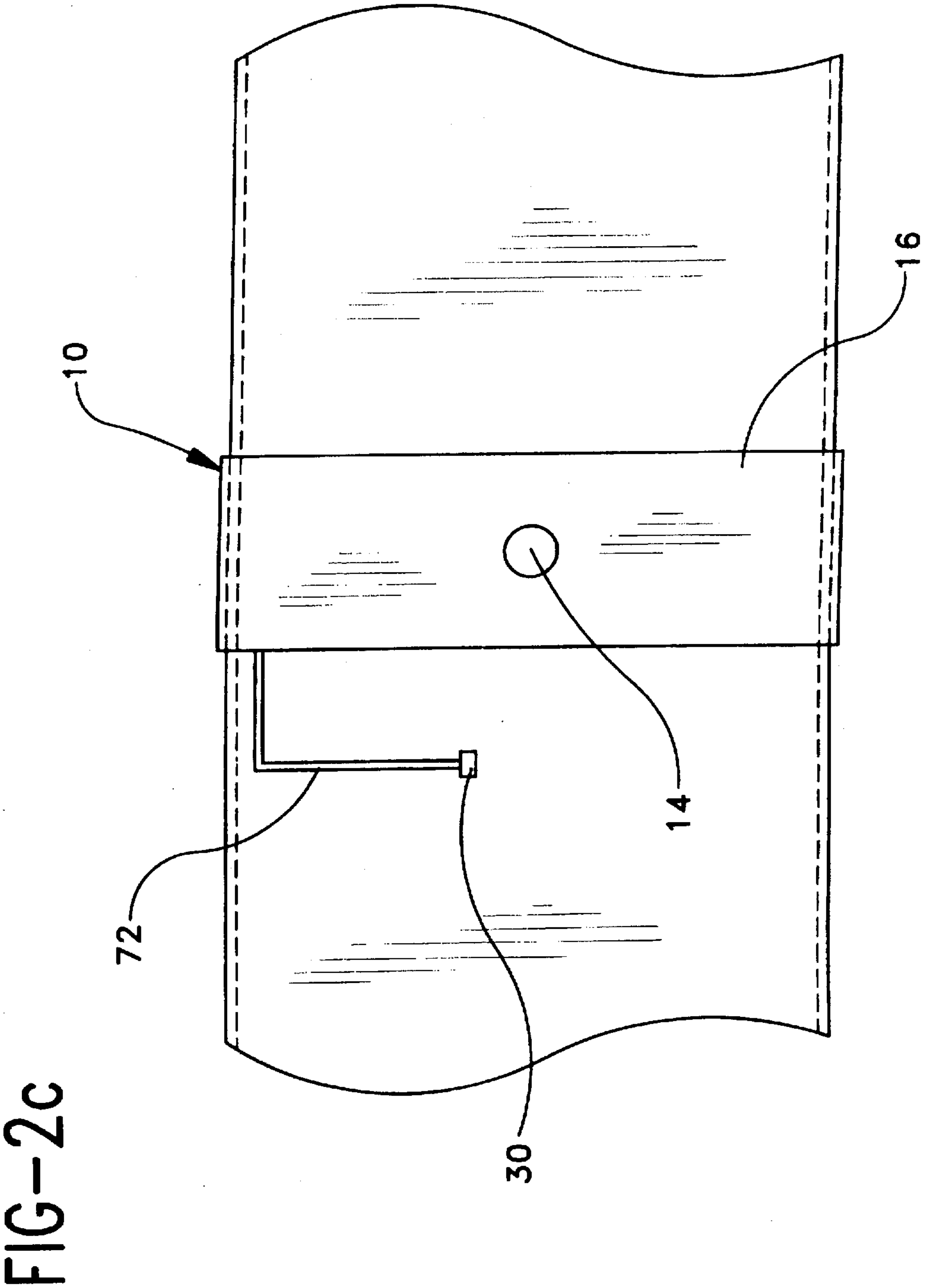
FIG. 2*c* is a side elevational view of the damper of FIG. 1 installed in a duct and depicting a sensor mounted on a bracket attached to the damper frame.
Figure 2D:
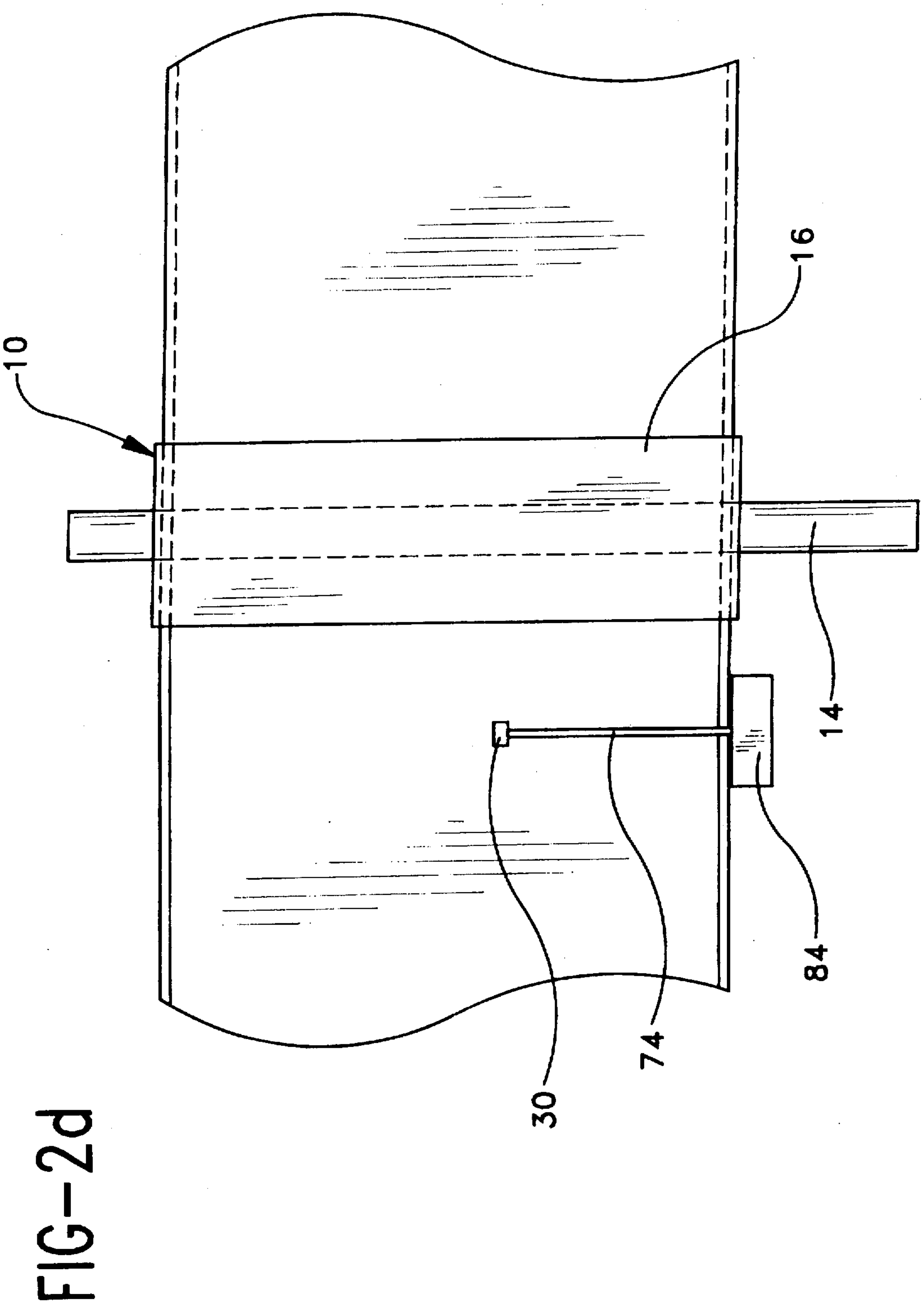
FIG. 2*d* is a top plan view of the damper of FIG. 1 installed in a duct and depicting a sensor mounted on a cantilevered shaft extending inward from a side wall of the duct.

As shown in FIG. 2*c*, sensor 30 may be secured to a bracket 72 attached to the damper frame and positioned to locate the sensor in the center of the duct. Alternatively, as shown in FIG. 2d, the sensor may be mounted on a cantilevered shaft 74 extending inward from a side wall of the duct.

In those embodiments in which sensor 30 is mounted in the center of the duct, it is often desirable to connect the sensing device to a control box 84 mounted exteriorly to the duct. Based on the type of sensing device employed in the sensor 30, the resultant signal delivered to the control box may be electrical, pneumatic or even hydraulic in nature.

As shown in FIGS. 1 and 2 the actuating mechanism of the present invention, which includes control means 20, sleeve 22, rod 24 and power-actuated unit 26, is located outside of the duct in which the damper is installed. This arrangement allows the above-mentioned components to be easily accessed for maintenance and inspection. This also limits the exposure of the components to high temperatures during a fire condition. Further, by positioning the actuating components outside the duct, air flow through the ventilation system is disturbed to a much lesser extent. Of course, the actuating mechanism of the present invention could be located inside the duct if, for example, the construction of a building did not provide sufficient space to locate such mechanism outside the duct or if the design specifications required such an arrangement.

The operation of damper 10 will now be described. To begin, the damper is installed at an appropriate location in a system of ducts, for example, in ventilation duct 32 shown in FIG. 1. A typical air ventilation system may include a plurality of such dampers arranged at various positions throughout the system. Further, the dampers may be sealingly installed in the system so that an effective barrier is created when the damper blade(s) is in the closed position.

Remotely operable control means 20, which is connected to shaft 14 through sleeve 22 and rod 24, is employed to move the damper blade from the normally closed position (due to the biasing effect of spring 18) to the open position and to hold the damper blade in such open position during normal operating condition. (A loss of power results in the fail-safe closed mode mentioned above). As discussed, the remotely operable control means is typically connected to a master control station in the building. From the master control station, an authorized fire-fighting person can selectively open and close the various dampers to facilitate the removal of smoke from the building.

Figure 3:
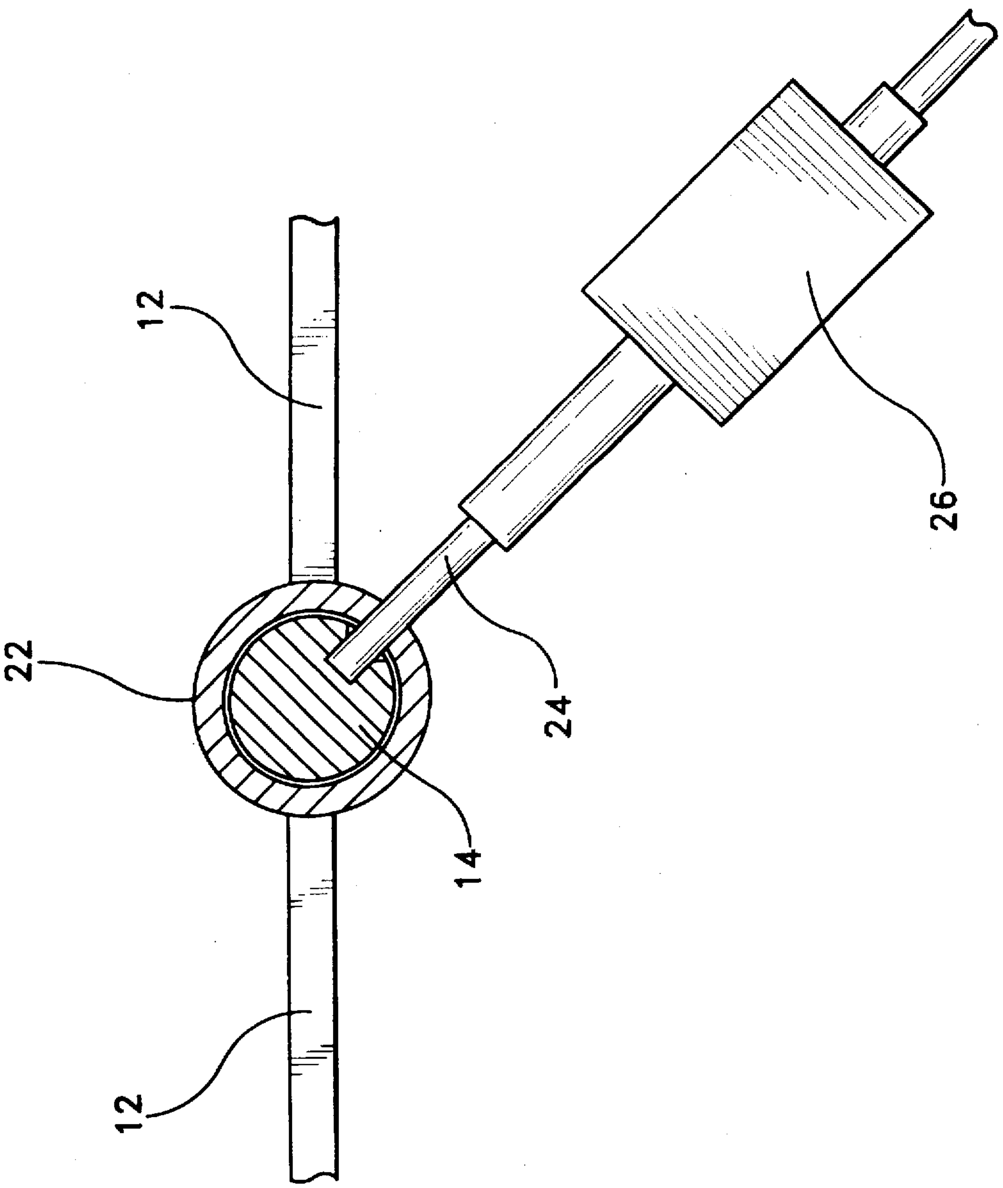
FIG. 3 is an enlarged cross-section of the actuating mechanism of the present invention showing the coupling in its engaged position.

As described above, the control means and sleeve are capable of being rotatably locked to shaft 14 through rod 24. In turn, rod 24 is controlled by power-actuated unit 26, which is capable of moving the rod between an engaged position and a disengaged position with sleeve 22 and shaft 14 (see FIGS. 3–4). Particularly, rod 24 may be extended into notch 34 of shaft 14. As also described, unit 26 is operatively connected to sensor 30. The design of the present invention, unlike the dampers of the prior art, allows sensor 30 to be positioned at a location remote from the damper. This flexibility allows the engineer designing the system to position the sensor at a location likely to provide early warning of a particular environmental condition (e.g., a fire condition) in the duct system. As also described, a plurality of sensors can be positioned at various locations throughout the system and interconnected so that if any one of the sensors is tripped, the damper will be actuated. The use of plural sensors increases the sensing capability of the system and also, at the same time, provides an additional level of safety, i.e., if one sensor fails to operate, a second sensor can still trip the damper. Finally, the system may employ a sensor capable of sensing the presence of smoke or of a particular hazardous gas.

When the environmental condition is sensed in the system by sensor 30, a signal is sent from the sensor to power-actuated unit 26. Because of the large rotational force imparted on shaft 14 by spring 18, a similarly large friction force is imparted on rod 24. However, as mentioned, power-actuated unit 26 is preferably of a pneumatic or electrical design and is capable of providing a large decoupling force to rod 24. In one preferred embodiment, the sensor interrupts a power source being supplied to the power-actuated unit. During normal operating conditions, the source provides power to the unit to maintain the rod in its engaged position. When the power is removed, a strong spring force, for example, may be employed to retract the rod into the unit.

Figure 4:
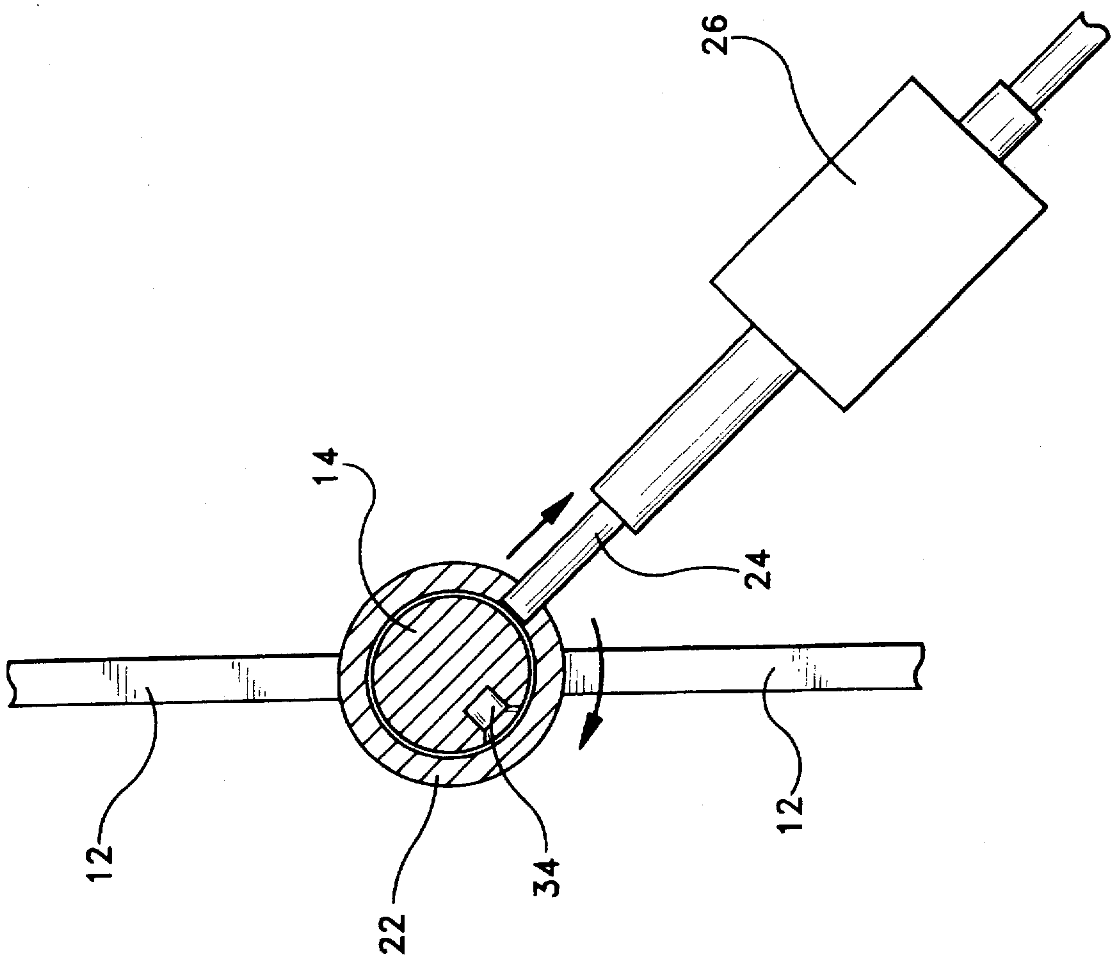
FIG. 4 is a view similar to FIG. 3 showing the coupling in its disengaged position.

As mentioned, when power-actuated unit 26 receives a signal from sensor 30, the unit retracts rod 24, thereby rotatably unlocking the shaft from the sleeve (see FIG. 4). Although control means 20 maintains the sleeve in the same position, shaft 14 and damper blade 12 are driven to the closed position by spring 18 once rod 24 is retracted. As part of the fail-safe closed mode, the system may be designed such that rod 24 is also retracted under loss-of-power conditions.

In one preferred embodiment, sensor 30 includes a bi-metal disk actuated switch. The switch, in response to a fire condition, may bleed down a control signal (either hydraulic or pneumatic) supplied to the power-actuated unit or may open an electric circuit between the solenoid and a power source.

After the temperature in the ventilation system drops to a temperature below the actuation temperature of the sensor, power-actuated unit 26 and sleeve 22 are rotated so that rod 24 is re-aligned with notch 34 in shaft 14. Rod 24 is then extended outward to re-engage sleeve 22 and shaft 14. In one preferred embodiment, this re-engagement process is accomplished automatically by the buildings fire control system following the inputting of a command from a fire fighter and/or in response to a measured system environmental condition. Once rod 24 is re-engaged, control means 20 is employed to reopen the damper, i.e., damper blade 12 is moved from the closed position to the open position.

Figure 5:
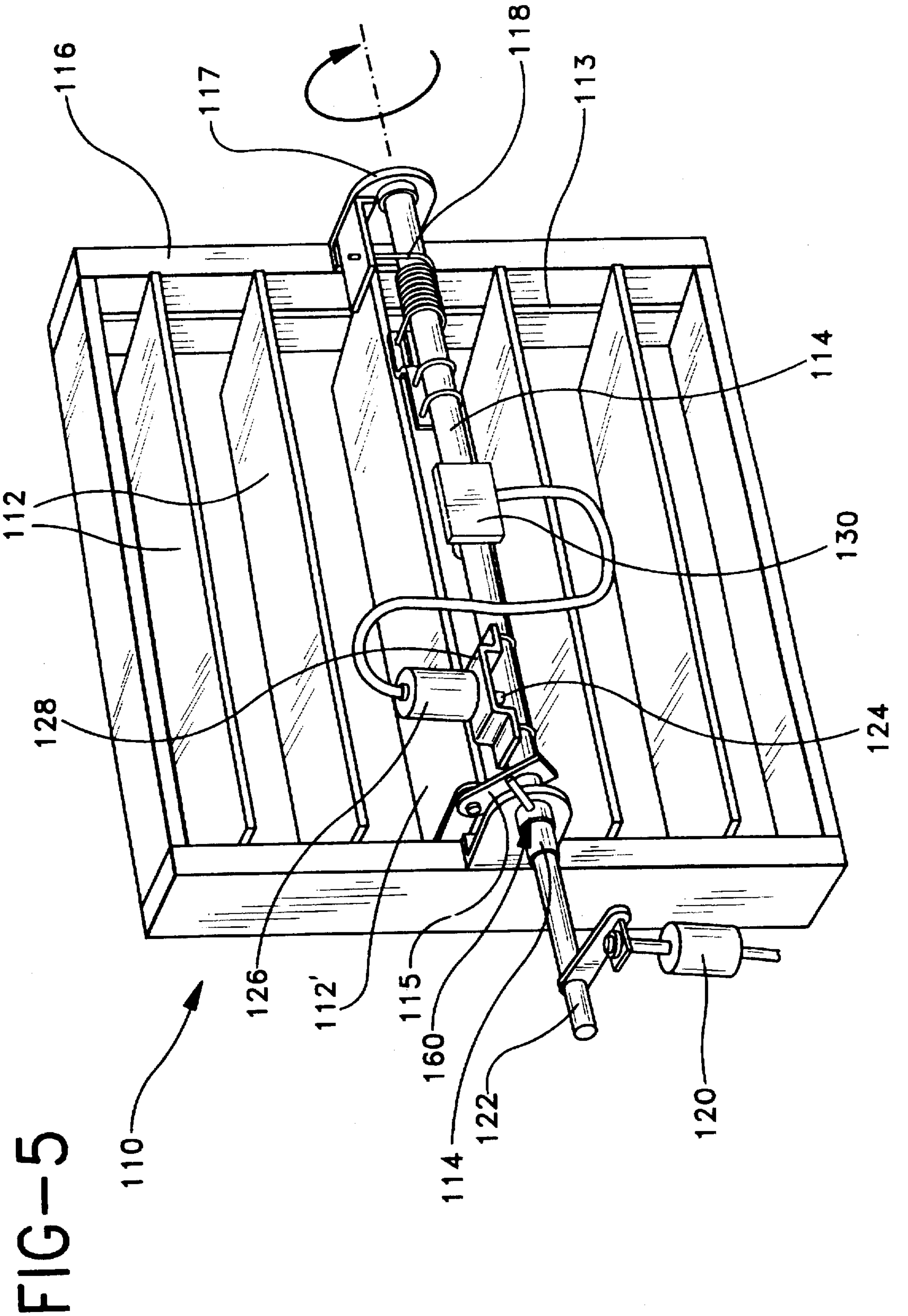
FIG. 5 is a perspective view of an alternative embodiment of the present invention.

In a preferred embodiment (as shown in FIG. 5), the damper, i.e., damper 110, includes a plurality of damper blades 112. The blades are interconnected by a common linkage 113 such that all of the blades cooperate as one integral unit.

The centrally-located blade, i.e. blade 112', is connected to shaft 114 through arm 115. Accordingly, as shaft 114 is rotated, arm 115 drives blades 112 between an open and closed position. Mounted to frame 116 is a bracket 117. A spring 118, which is connected between shaft 114 and bracket 117, imparts a rotational force to shaft 114, tending to drive the connected blades to the closed position.

Remotely operable control means 120 is positioned to rotatably drive operating linkage 122. Operating linkage 122 has an outer diameter smaller than the inner diameter of shaft 114 such that operating linkage 122 may extend within shaft 114. Of course, other arrangements are also contemplated. Preferably, operating linkage 122 is rotatably coupled to shaft 114 through a coupling such as rod 124.

In turn, rod 124 is operatively connected to a power-actuated unit 126 that is capable of moving the rod between an engaged position with operating linkage 122 and shaft 114 in which control means 120 is in mechanical communication with the damper blades and a disengaged position with the operating linkage and shaft in which the control means is mechanically isolated from the damper blades. As shown, power-actuated unit 126 may be located interiorly of the duct and be attached to shaft 114 by means of a mounting plate 128. In such an arrangement, the power-actuated unit will rotate in step with the shaft when the damper is tripped, thus maintaining alignment of the coupling in such shaft thereby facilitatingly re-engagement of the shaft to operating linkage 122. Of course, the power actuated unit may also be located exteriorly of the duct as described hereinabove with respect to damper 10.

Specifically, when rod 124 is in the engaged position, control means 120, which is in mechanical communication with the damper blades, may be employed to move the damper blades between the open position and the closed position. The control means may also be employed to hold the damper blades in the open position during normal operating conditions.

Damper 110 also includes a sensor 130 for sensing a particular environmental condition (e.g., a fire condition) in the duct system. The sensor is operatively connected to power-actuated unit 126 to provide the unit with a signal in response to the environmental condition whereby the coupling is disengaged from the operating linkage and shaft allowing the blades to be driven to the closed position. As discussed above, the sensor is preferably mounted in the center of the duct to facilitate the detecting of an environmental condition in such duct. Sensor 130 may be conveniently positioned on shaft 114 traversing the duct. Of course, other arrangements such as the arrangement depicted in FIG. 2*d* in which the sensor is mounted on a bracket secured to the damper frame are also contemplated.

Figure 5A:
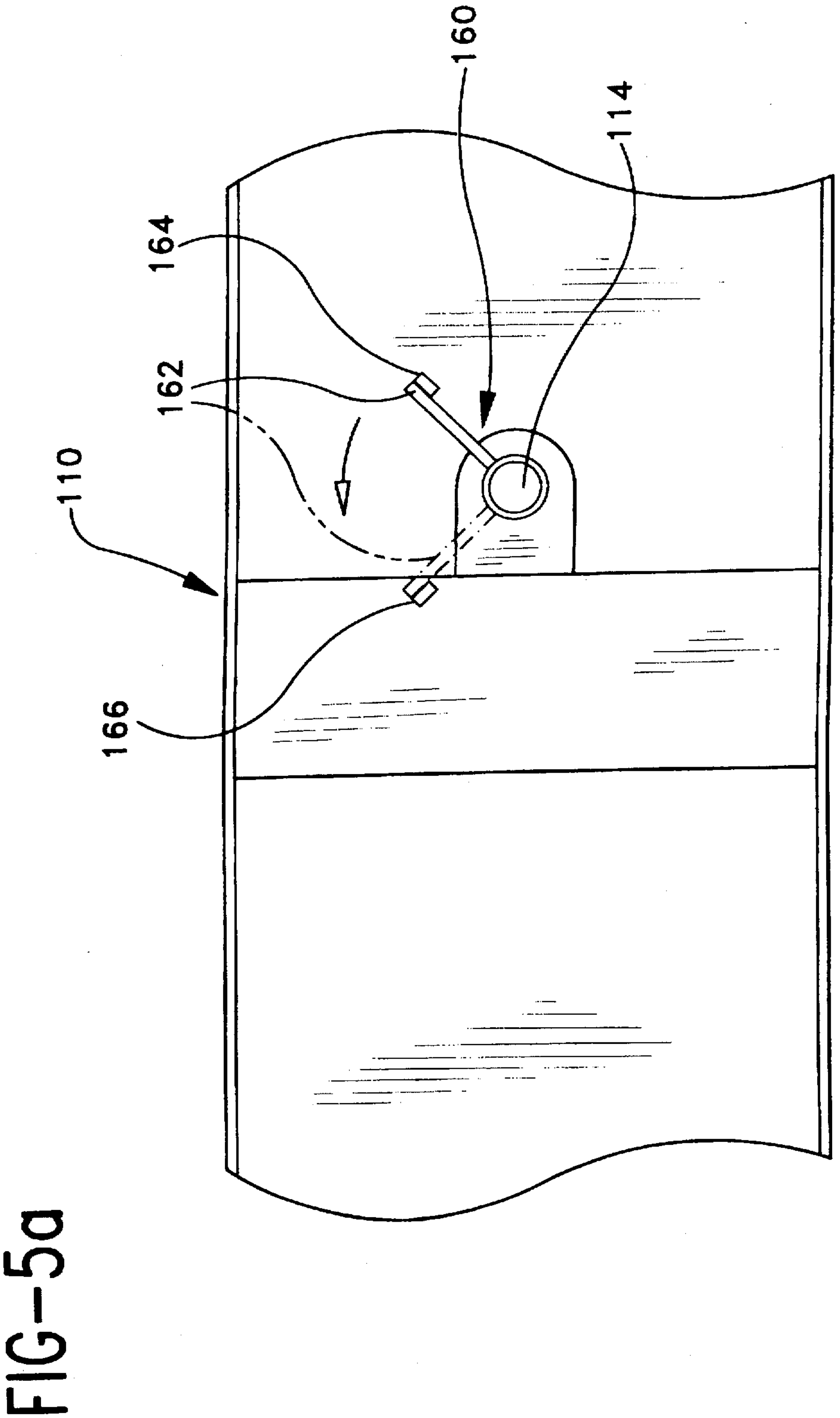
FIG. 5*a* is a side elevational view of the damper of FIG. 5 employing a damper blade position indicator.

Referring to FIG. 5*a*, damper 110 may also include a position indicator 160 located external to the duct on shaft 114. Position indicator 160 includes signal arm 162 and position sensors 164, 166, and operates in the same manner as position indicator 60 discussed hereinabove.

Figure 5B:
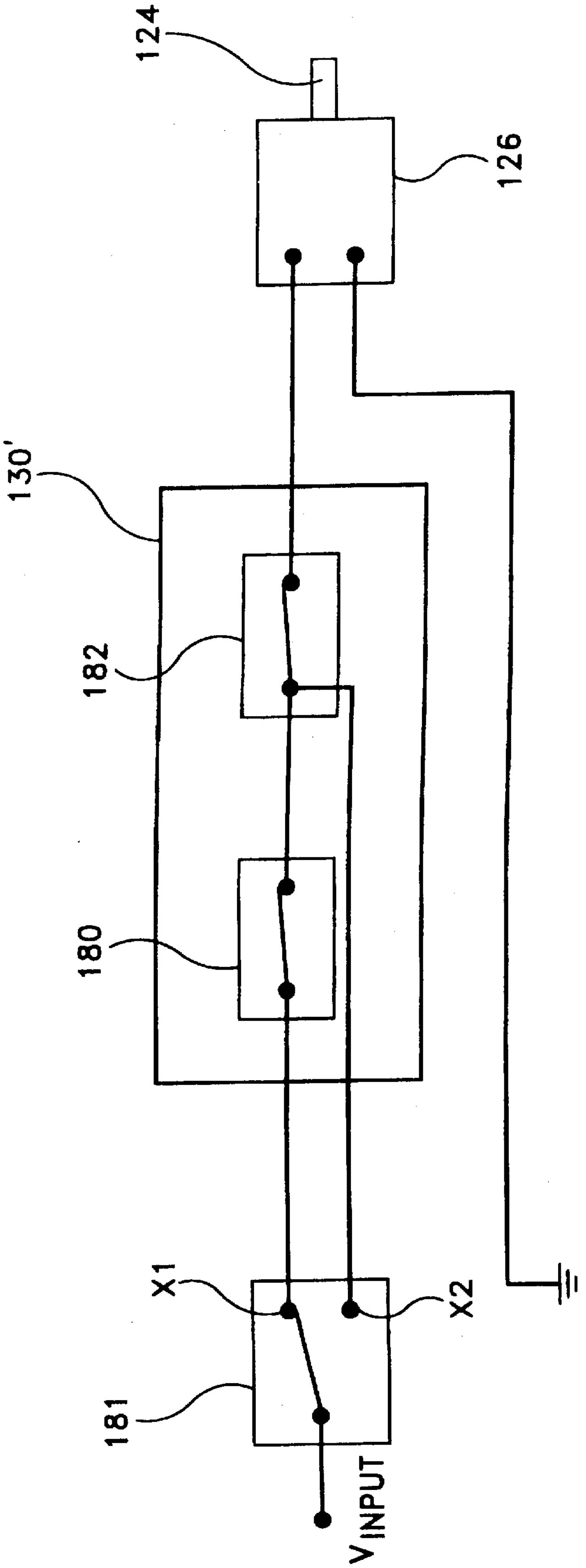
FIG. 5*b* is an electrical schematic of a temperature-sensing control circuit.

One particularly preferred sensor, i.e., sensor 130' shown in FIG. 5*b*, employs two temperature sensing devices 180 and 182 for sensing temperatures $T_1$ and $T_2$, respectively, wherein $T_1$ is less than $T_2$. Sensing devices 180 and 182 are preferably bimetal disc switches, and may be chosen such that $T_1$ is from about 150° to 160° F. and $T_2$ is from about 275° to 325° F. During normal (i.e., non-fire) conditions the pole of switch 181 is in position $X_1$ and the switches of sensing devices 180 and 182 are closed, thus creating a complete circuit which allows power to be applied to power-actuated unit 126 such that the damper blades are held in the open position.

When the temperature in the duct reaches $T_1$, the switch of sensing device 180 is opened, thus breaking the circuit to power-actuated 126 which causes the damper blades to close. Sensing device 180 is automatically resettable upon cooling, that is, the sensing device automatically resets itself after the temperature in the duct falls below $T_1$. At such time as the temperature falls below $T_1$, the damper can be reopened in a normal fashion.

As long as the temperatures remains below $T_2$, a fire fighter may remotely override sensing device 180 to allow remote operation of the damper blade. In one preferred embodiment, a fire fighter can move the pole of switch 181 to position $X_2$, thus bypassing the open switch in sensing device 180.

The incorporation of sensing device 182 into the system ensures that a fire fighter will not be able to remotely operate the damper blades when a local fire condition is present. That is, when the temperature in the duct reaches $T_2$, the switch of sensing device 182 opens, thus breaking the electrical circuit to power actuated unit 126, even if the switch of sensing device 180 has been bypassed.

In one preferred embodiment, damper 110 includes a manual reset switch 186. Accordingly, after the temperature in the duct has reached $T_2$ and the switch of sensing device 182 has been opened, manual reset switch 186 must be thrown by a fire fighter before any attempt can be made to remotely operate the damper (assuming of course the temperature has fallen below $T_2$). This reset switch may be positioned on the outside wall of the duct (e.g., on a control box similar to control box 84 shown in FIG. 2*d*) or may be positioned at a location near the damper, but readily accessible to a fire fighter, e.g., within a locked wall-mounted box 188. Following a fire condition in which the switch of sensing device 182 has opened, a fire fighter must physically travel to the location of the damper. The fire fighter can then visually verify the position of the damper blade by inspecting signal arm 162. Thereafter, the fire fighter can activate the manual reset switch, thus allowing the command station to remotely operate the damper, for example to purge smoke from the duct network. In such an embodiment, sensing device 182 is also automatically resettable, i.e., device 182 resets when the temperature falls below $T_2$.

As will be appreciated by those skilled in the art, the incorporation of a manual reset switch which is tripped when the temperature in the duct reaches $T_2$ may be accomplished in a number of ways including but not limited to the use of an electric relay, i.e., relay 190. Relay 190 may be conveniently located in box 188.

Figure 6:
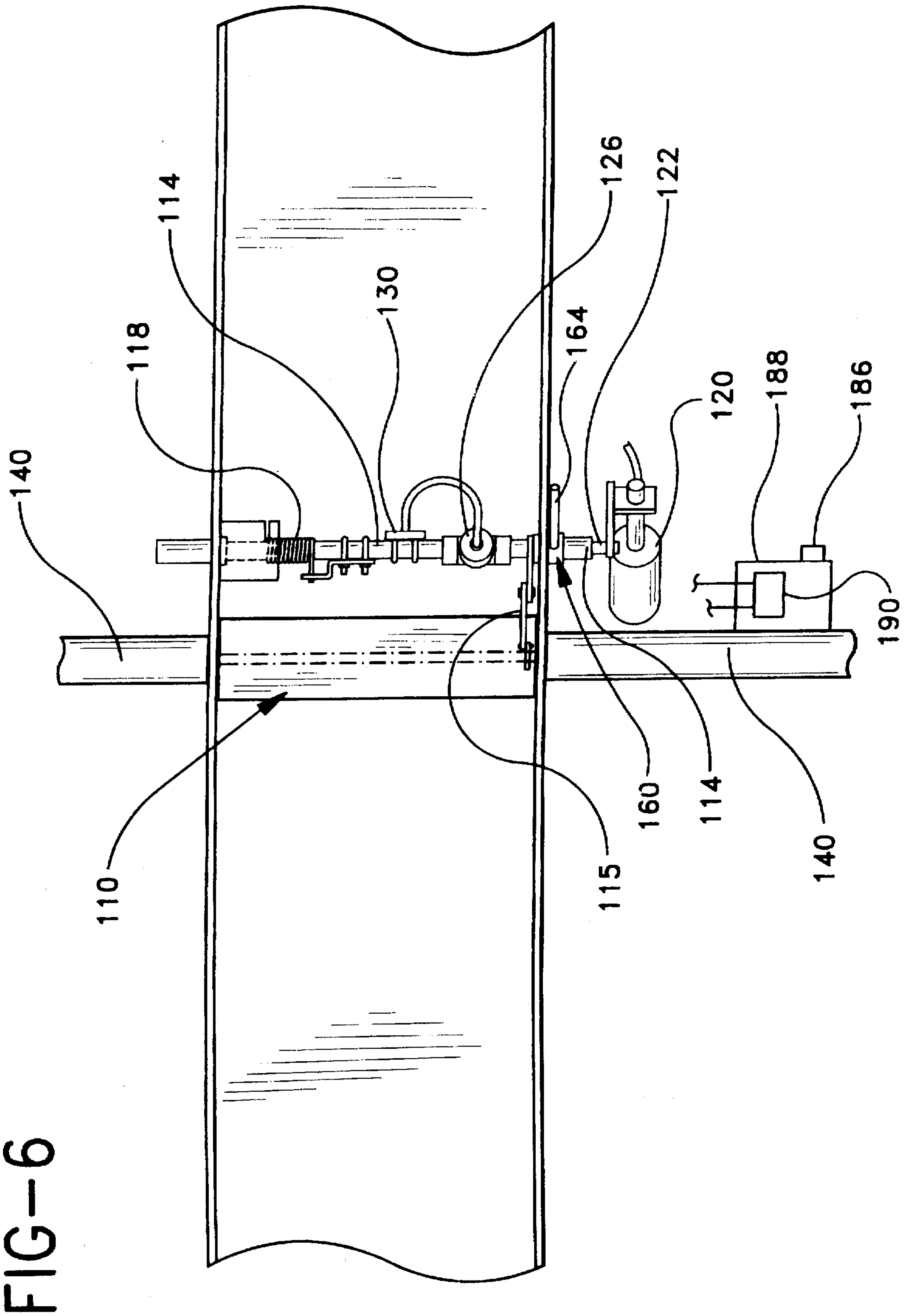
FIG. 6 is a top plan view of the embodiment of FIG. 5 depicting such embodiment installed in a firewall.

When employed as a fire damper, the blades of the damper are generally fabricated from a high temperature material such as steel. The damper blades are typically designed to sealingly engage the frame of the damper when in the closed position, thereby limiting passage of smoke therethrough. Finally, as shown in FIG. 6, the damper is preferably installed within an opening in a firewall 140. The embodiment of the present invention illustrated in FIG. 5 facilitates such an installation in that the actuating mechanism of the damper (i.e., shaft 114, spring 118, control means 120, operating linkage 122, coupling 124 and power-actuated unit 126) are positioned forward of the frame of the damper so that they do not interfere with the fire wall.

During the installation stage of either damper 10 or damper 110, it is oftentimes desirable to open the blades of the damper to allow circulation of air through the ducts. This task can prove rather difficult prior to the installation and setup of the remotely operable control means and the power-actuated unit, which are employed to operate the damper during normal use. Particularly, an individual who attempts to manually open the blades of the damper may damage such blades in the attempt.

Figure 7:
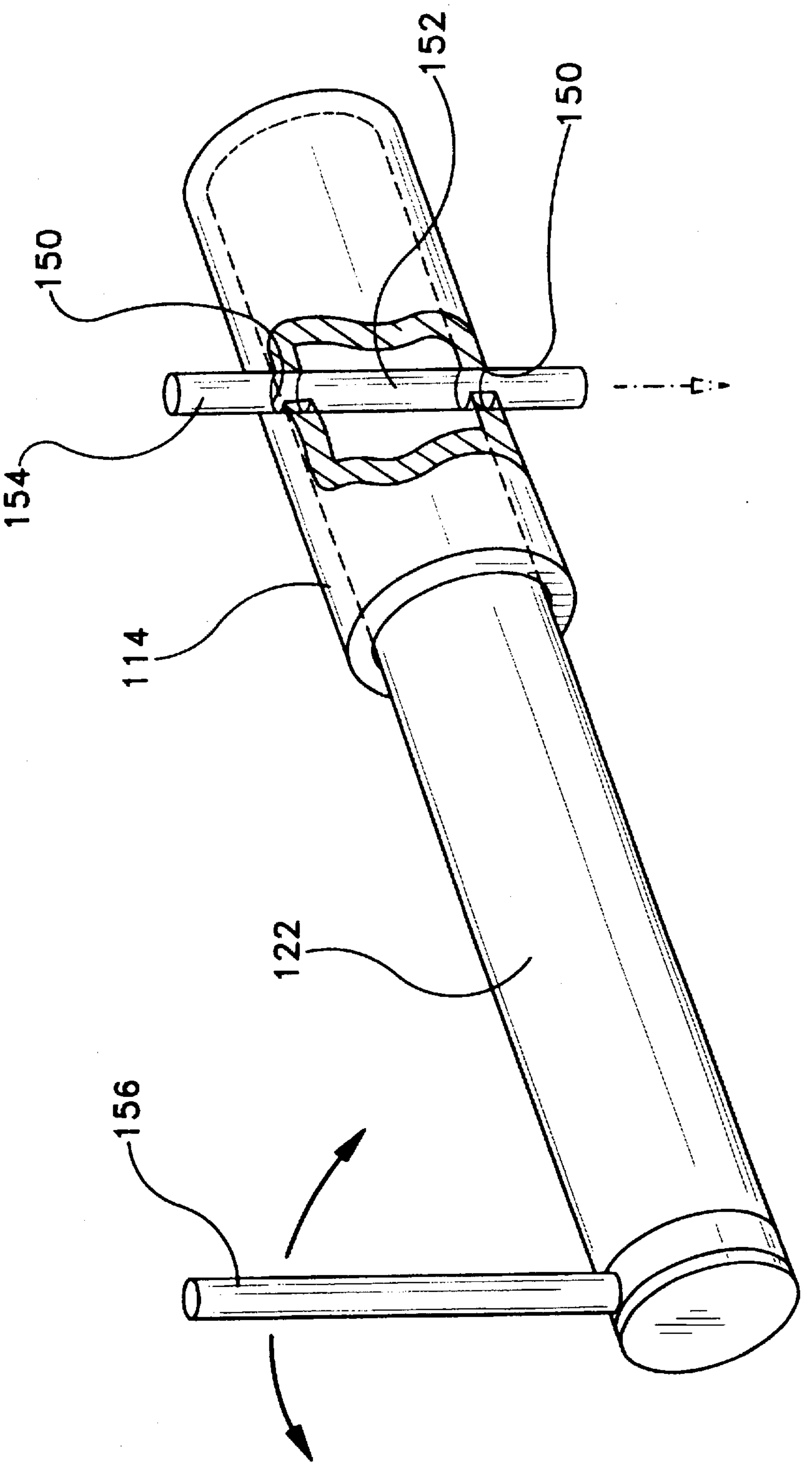
FIG. 7 shows an alternative embodiment of the actuating mechanism wherein such mechanism includes a slot for receipt of a retaining pin.

Accordingly, as shown in FIG. 7, shaft 114 may be provided with openings 150, which may be aligned with a slot 152 formed in the operating linkage. An individual is therefore able to align the openings with the slot and, thereafter, insert a retaining pin 154 through the two members, thereby rotatably locking the two members together. A handle 156 may then be removably attached to the operating linkage of the damper such that the damper blades can be manually operated by rotation of the handle. As will be appreciated by those skilled in the art, retaining pin 154 will be maintained in slot 152 due to the rotational force imparted on such pin by shaft 114.

Figure 9:
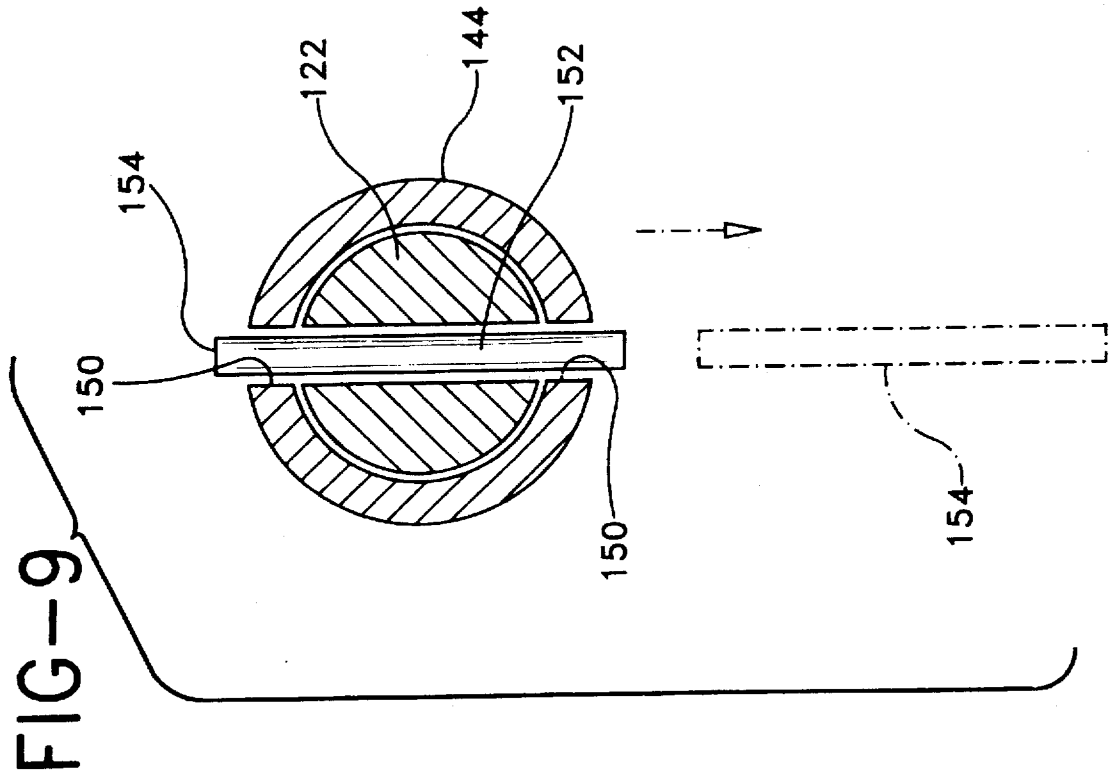
FIG. 9 is a cross-sectional view depicting the release of the retaining pin from the slot in the shaft.
Figure 8:
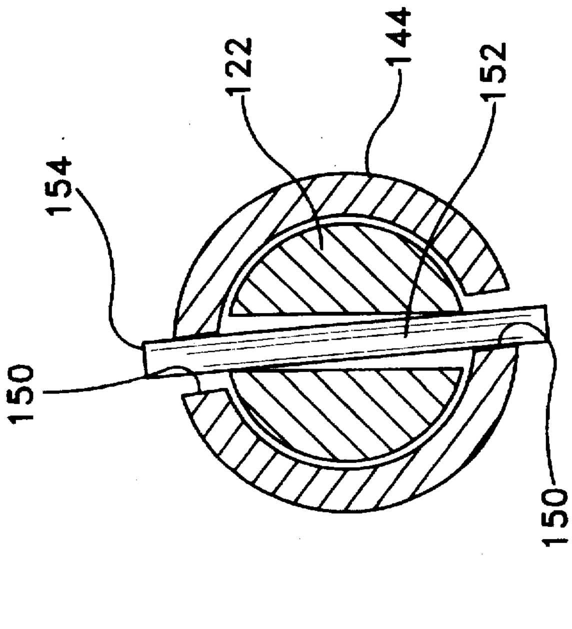
FIG. 8 is a cross-sectional view depicting the retaining pin wedged between the operating linkage and the shaft.

In a preferred embodiment, slot 152 is arranged in operating linkage 122 such that the slot is positioned in a vertical orientation when the blades are closed. When shaft 114 is rotated by handle 156, as shown in FIG. 8, pin 154 becomes wedged in the slot, thereby rotatably locking shaft 114 to operating linkage 122. As a result of this arrangement, the retaining pin will automatically fall out of slot 152 (see FIG. 9) once the damper blades are returned to the closed position. This ensures that retaining pin 154, which is designed to temporarily lock shaft 114 to linkage 122, is not accidentally left in the slot following the installation of the damper.

Of course, other pin designs and configurations are also contemplated. For example, a spring-loaded pin could be employed. Alternatively, a cotter pin or headed pin may also be employed, although such pins would require manual removal. Other means for temporarily locking shaft 114 to the operating means are also contemplated.

Thus, while there have been described what are presently believed to be the preferred embodiments of the invention, those skilled in the art will realize that various changes and modifications may be made to the invention, and it is intended to claim all such changes and modifications which fall within the scope of the invention.

What is claimed is:

1. A remotely trippable and resettable damper for installation in a system of ducts, comprising:

a damper blade assembly including at least one damper blade operable between an open position and a closed position and a rotatably supported shaft connected to said blade whereby rotation of said shaft moves said blade between said open and closed positions, said shaft being biased to drive said blade to said closed position;

remotely operable control means releasably connected to said damper blade assembly for moving said damper blade between said open and closed positions and for holding said damper blade in said open position during normal operating conditions;

a power-actuated unit for disengaging said damper blade assembly from said control means;

means for remotely re-engaging said damper blade assembly to said control means following a tripping of said damper; and a remotely locatable sensor for sensing an environmental condition in said system, said sensor being centrally disposed in a duct of said system to ensure exposure to a representative sample of airflow, said sensor being operatively connected to said power-actuated unit to provide said power-actuated unit with a signal in response to said condition whereby said damper blade assembly is disengaged from said control means allowing said damper blade to be driven to said closed position.

2. The damper according to claim 1, wherein said sensor includes a first sensing device for sensing temperature level $T_1$, and wherein said first sensing device provides a signal to said power-actuated unit to close said damper when the duct temperature reaches temperature level $T_1$.

3. The damper according to claim 2, wherein said sensor further comprises a second sensing device for sensing temperature level $T_2$, and further comprising a reset switch to prevent remote operation of the damper blade after the duct temperature reaches temper level $T_2$, and wherein said second sensing device provides a signal upon reaching temperature level $T_2$ to trip said reset switch thus preventing remote operation of said damper.

4. The damper according to claim 3, further comprising a relay, said relay operatively connecting said second sensing device to said reset switch.

5. The damper according to claim 4, wherein said relay and said reset switch are mounted exteriorly to the duct.

6. The damper according to claim 3, wherein said first and second sensing devices are mounted on a bracket attached to the damper frame.

7. The damper according to claim 3, wherein said first and second sensing devices are mounted on a cantilevered shaft extending inward from a sidewall of said duct.

8. A remotely trippable and resettable damper for installation in a system of ducts, comprising:

a damper blade assembly having at least one damper blade operable between an open position and a closed position and a rotatably supported shaft connected to said blade whereby rotation of said shaft moves said blade between said open and closed positions, said shaft being biased to drive said blade to said closed position;

remotely operable control means releasably connected to said damper blade assembly for moving said damper blade between said open and closed positions and for holding said damper blade in said open position during normal operating conditions;

a power-actuated unit for disengaging said damper blade assembly from said control means;

means for remotely re-engaging said damper blade assembly to said control means following a tripping of said damper;

a damper blade position indicator for sensing whether said damper blade is in said open or closed position; and a remotely locatable sensor for sensing an environmental condition in said system, said sensor operatively connected to said power-actuated unit to provide said power-actuated unit with a signal in response to said condition whereby said damper blade assembly is disengaged from said control means allowing said damper blade to be driven to said closed position.

9. The damper according to claim 8, wherein said position indicator includes a signal arm positioned exteriorly to the duct and connected to rotate in response to rotation of said shaft thus visually indicating whether said damper blade is in said open or closed position.

10. The damper according to claim 9, wherein said position indicator further includes a pair of sensors positioned for contact with said signal arm as said signal arm rotates in response to rotation of said shaft.

11. The damper according to claim 10, wherein said sensors are selected from the group consisting of mechanically actuated limit switches and magnetically sensitive proximity switches.

12. A remotely trippable and resettable damper for installation in a system of ducts, comprising:

a damper blade assembly including a plurality of interconnected damper blades operable between open and closed positions, said damper blade assembly further including a rotatably supported shaft connected to at least one of said blades whereby rotation of said shaft moves said blades between said open and closed positions, said shaft being biased to drive said blades to said closed position;

remotely operable control means releasably connected to said damper blade assembly for moving said damper blades between said open and closed positions and for holding said damper blades in said open position during normal operating conditions;

a power-actuated unit for disengaging said damper blade assembly from said control means;

means for remotely re-engaging said damper blade assembly to said control means following a tripping of said damper; and a remotely locatable sensor for sensing an environmental condition in said system, said sensor operatively connected to said power-actuated unit to provide said power-actuated unit with a signal in response to said condition whereby said damper blade assembly is disengaged from said control means allowing said damper blade to be driven to said closed position.

13. The damper according to claim 12, wherein said plurality of damper blades are interconnected by a common linkage.

14. The damper according to claim 12, wherein said damper blade assembly further includes a frame, said frame having opposing brackets mounted thereto to rotatably support said shaft.

15. The damper according to claim 14, wherein said shaft is laterally spaced from said frame to facilitate installation of said damper in a fire wall.

16. The damper according to claim 12, further comprising a damper blade position indicator located exteriorly of said duct and coupled to said shaft for sensing whether said damper blade is in said open or closed position.

17. The damper according to claim 12, wherein said sensor is centrally disposed in a duct of said system to ensure exposure to a representative sample of air flow.

18. The damper according to claim 12, wherein said sensor includes first and second sensing devices for sensing temperature levels $T_1$ and $T_2$ respectively, and wherein said first sensing device provides a signal to said power-actuated unit to close said damper when the duct temperature reachers temperature level $T_1$, and further comprising a reset switch to prevent remote operation of the damper blade after the duct temperature reaches temperature level $T_2$, and wherein said second sensing device provides a signal to trip said reset switch upon reaching temperature level $T_2$ thereby preventing remote operation of the damper.

19. The damper according to claim 12, further composing an operating linkage connected to said control means, and wherein said power-actuated unit includes a retractable coupling movable between an engaged position with said operating linkage and said shaft whereby said control means is in mechanical communication with said damper blade assembly and a disengaged position with said operating linkage and said shaft whereby said control means is mechanically isolated from said damper blade assembly.

20. The damper according to claim 19, wherein said retractable coupling is powered to move to said disengaged position under loss-of-power conditions.

* * * * *